United States Patent
Vadde Makkalla et al.

(10) Patent No.: US 11,374,791 B2
(45) Date of Patent: Jun. 28, 2022

(54) ORCHESTRATION OF SUBNETWORK EXTENSIONS ACROSS A WIDE AREA NETWORK

(71) Applicant: Hewlett Packard Enterprise Development LP, Houston, TX (US)

(72) Inventors: Krishna Nataraj Vadde Makkalla, Bangalore Karnataka (IN); Manoj Kareti, Bangalore Karnataka (IN); Sanjay Kaniyoor Surendra Hegde, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 79 days.

(21) Appl. No.: 16/939,746

(22) Filed: Jul. 27, 2020

(65) Prior Publication Data

US 2021/0036888 A1 Feb. 4, 2021

(30) Foreign Application Priority Data

Jul. 31, 2019 (IN) .............................. 201941031006

(51) Int. Cl.
*H04L 12/46* (2006.01)
*H04L 49/00* (2022.01)
(Continued)

(52) U.S. Cl.
CPC ...... *H04L 12/4633* (2013.01); *H04L 12/4641* (2013.01); *H04L 12/66* (2013.01);
(Continued)

(58) Field of Classification Search
CPC ............. H04L 12/4633; H04L 12/4641; H04L 12/4616; H04L 12/4604; H04L 12/66
See application file for complete search history.

(56) References Cited

U.S. PATENT DOCUMENTS 7,120,145 B2 10/2006 Onba et al.
7,477,593 B2 1/2009 Scudder et al.
(Continued)

FOREIGN PATENT DOCUMENTS

EP 3053053 A1 8/2016

OTHER PUBLICATIONS

"Data Center Gateway Clusters", pp. 1-36, Retrieved from the Internet on Mar. 28, 2019 from URL: >support.riverbed.com/bin/support/static/drr5abac55gjf3t2ouklprib2p/html/3g9d2i72jnt89410rhhtjrpc5h/sc_ug_html/index.html#page/sc_ug/datacenters.html>.

(Continued)

*Primary Examiner* — Min Jung
(74) *Attorney, Agent, or Firm* — Hewlett Packard Enterprise Patent Department

(57) ABSTRACT

An example network orchestrator includes processing circuitry and a memory including instructions that, when executed by the processing circuitry, cause the network orchestrator to determine that a branch site of a WAN includes multiple branch gateways. The network orchestrator further determines that devices of a core site of the WAN and devices of the branch site are members of an extended VLAN. The network orchestrator further transmits a first command to a first branch gateway and a first headend gateway to establish a WAN uplink tunnel to forward data traffic of the extended VLAN. The network orchestrator further transmits a second command to a set of branch gateways of the branch gateway cluster to establish intracluster tunnels with the first branch gateway.

20 Claims, 5 Drawing Sheets

(51) Int. Cl.
*H04L 45/74* (2022.01)
*H04L 45/00* (2022.01)
*H04L 12/66* (2006.01)

(52) U.S. Cl.
CPC .............. *H04L 45/46* (2013.01); *H04L 45/74* (2013.01); *H04L 49/309* (2013.01)

(56) References Cited

U.S. PATENT DOCUMENTS

| | | |
|---|---|---|
| 8,750,122 B1 | 6/2014 | Assarpour |
| 9,054,951 B2 | 6/2015 | Patel et al. |
| 10,110,469 B2 | 10/2018 | Manthiramoorthy et al. |
| 10,164,795 B1 | 12/2018 | Madasamy et al. |
| 2004/0174887 A1 | 9/2004 | Lee |
| 2014/0092907 A1* | 4/2014 | Sridhar ............... H04L 12/4633 370/392 |
| 2016/0255542 A1 | 9/2016 | Hughes et al. |
| 2016/0261428 A1* | 9/2016 | Song ..................... H04L 61/103 |
| 2018/0041420 A1* | 2/2018 | Saad ....................... H04L 47/22 |
| 2021/0036983 A1* | 2/2021 | Vadde Makkalla .......................... H04L 12/4683 |

OTHER PUBLICATIONS

"L2VPN Loop Detection," Dec. 5, 2018, pp. 1-2, Retrieved from the Internet on Apr. 20, 2013 from URL: <support.huawei.com/enterprise/en/doc/EDOC1100058940/519f3c47/l2vpn-loop-detection>.

* cited by examiner

ORCHESTRATION OF SUBNETWORK EXTENSIONS ACROSS A WIDE AREA NETWORK

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and headend gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and headend gateways) controls certain aspects of routing for their respective LAN, but a network orchestrator controls the overall switching and routing across the WAN.

In some network topologies, it is advantageous for a network administrator to extend a virtual local area network (VLAN) across multiple physical LANs of the WAN. While the purposes achieved by this topology are numerous and well known to those having ordinary skill in the art, a few examples include routing guest network traffic to centralized services, such as a demilitarized zone (DMZ), connecting redundant LAN sites, such as datacenters, and migrating equipment between sites.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
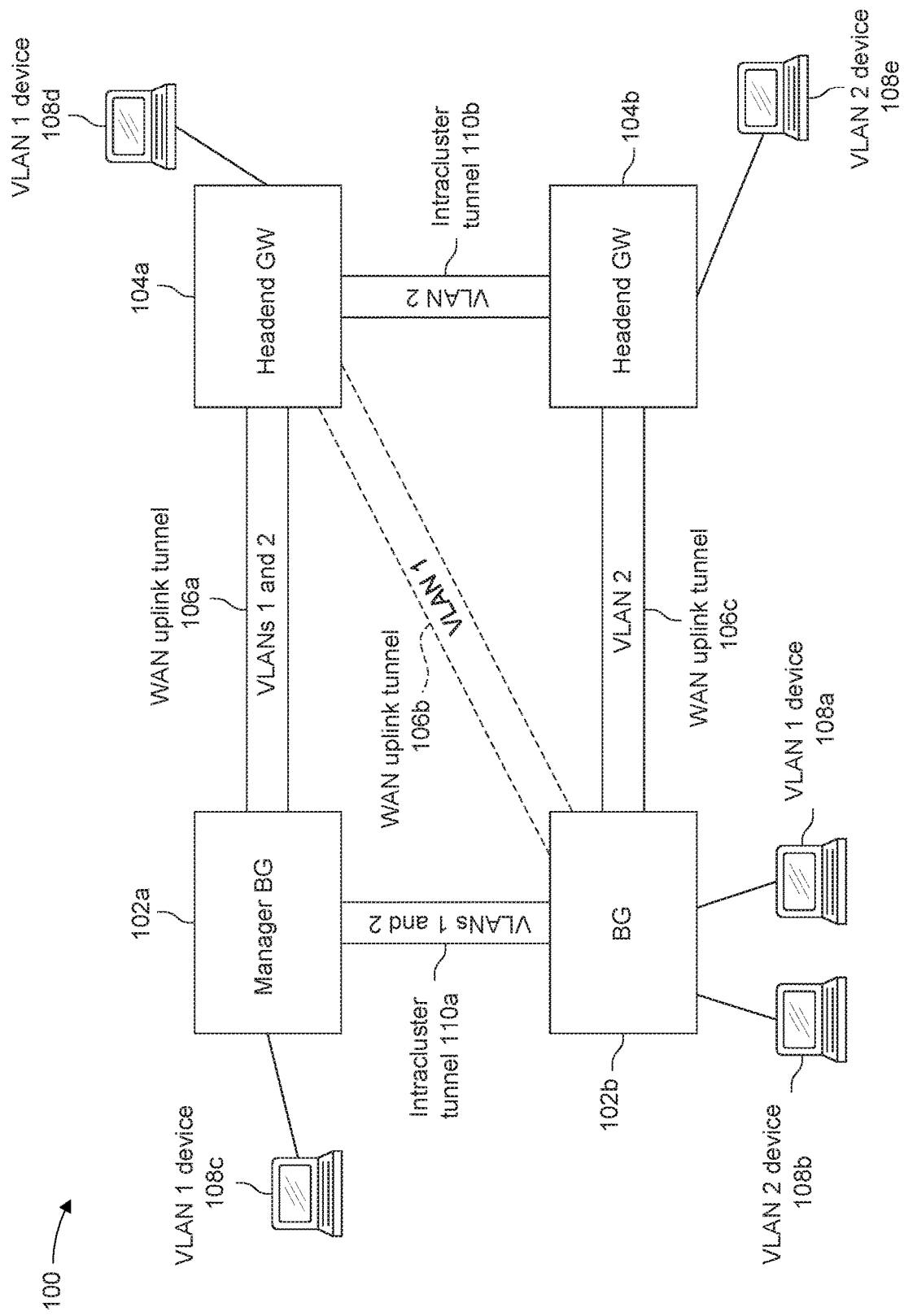
FIG. 1 illustrates an example wide area network (WAN) including WAN uplink tunnels and intracluster tunnels to extend virtual local area networks (VLANs) across the WAN.

Certain examples have features that are in addition to or in lieu of the features illustrated in the above-referenced figures. Certain labels may be omitted from certain figures for the sake of clarity.

DETAILED DESCRIPTION

In certain wide area networks (WANs), such as large enterprise networks, a network administrator may simplify routing between multiple physical local area networks (LANs) by extending one or more virtual local area networks (VLANs) between the LANs. Since VLANs are an OSI layer 2 (L2) construct, a VLAN extended across multiple LAN sites will behave differently than an IP subnet extended across multiple LAN sites. One prominent example of the difference is that an extended VLAN exists in a single broadcast domain, potentially causing relatively low-bandwidth links (e.g. WAN uplinks such as software defined wide area network (SD-WAN) links) to become inundated with broadcast messages sent to devices of the VLAN.

As an example, in a simple WAN topology with a branch site connected to a core site via a SD-WAN uplink, one method for extending a VLAN across a WAN is for the network administrator to establish a L2 generic routing encapsulation (GRE) tunnel between the branch gateway (BG) of the branch site and the headend gateway (HG) of the core site. A client device connected to the BG (either directly or indirectly through one or more switches and other L2 transparent network infrastructure devices) is assigned to VLAN1, as is a client device connected to the HG (either directly or indirectly).

The network administrator configures the network orchestrator to establish the GRE tunnel and to alter the flows associated with VLAN1 to pass data traffic between devices of VLAN1 located in separate LANs across the L2 GRE tunnel. This configuration may be rather complicated in and of itself, but the complexity of the configuration increases as the complexity of the topology increases.

As WANs increase in complexity and size, single points of failure (such as BGs or HGs) are disfavored. Instead, network topologies are designed to embrace the principles of high availability (HA). Although HA encompasses many different aspects of network architecture, one relevant component of HA is the deployment of redundant gateways to allow for seamless failover when a gateway encounters a failure.

In a simple example, each of the branch site and the core site includes a pair of gateways (BGs and HGs, respectively) that are interconnected. In some examples, the pair may be interconnected in an "Active-Standby" configuration, where one gateway of the pair is the active gateway that transacts data for the site, and the other gateway is idly standing by in case the active gateway fails. However, this is an inefficient used of gateway resources. Alternatively, the pair may be interconnected in an "Active-Active" configuration. The Active-Active configuration causes all gateways of a cluster (a group of redundant gateways at a certain site) to forward portions of the data traffic to and from the site. While an Active-Active configuration is more complicated to configure and administer, it also more fully uses available hardware and bandwidth resources. However, the additional configuration and administration complexity also applies to VLAN extension across the sites.

Specifically, if an L2 GRE tunnel is established between a first BG at the branch site and a first HG at the core site, devices of the relevant VLAN that are connected (directly or indirectly) to the second BG at the branch site may be "black holed" because there is no L2 transparent route between the second BG and the rest of the WAN. Many solutions, including combinations of WAN uplink tunnels and intracluster tunnels, can be configured by a network administrator to achieve full connectivity across an extended VLAN. However, this configuration can be intricate and prone to misconfiguration.

In this disclosure is described an improved method for orchestrating extended VLANs across a SD-WAN where LANs of the SD-WAN include clustered gateways. In some examples, a network orchestrator determines that a VLAN is shared across multiple LANs. The network orchestrator transmits commands to relevant gateways of each LAN to establish WAN uplink tunnels between the LANs. Additional standby WAN uplink tunnels are established in case a failure severs the route using the primary WAN uplink tunnels, and an intracluster tunnel mesh is established between gateways of each cluster. In some examples, each cluster is managed by a manager gateway (e.g. Manager BG 102a, Headend GW 104a), which is elected from the cluster. The manager gateway assigns responsibilities to resources, such as, for example, the responsibility to terminate standby WAN uplink tunnel 106b to BG 102b.

This disclosure contemplates any portion of this configuration being achieved automatically via the network orchestrator, manually via a network administrator, or in a hybrid fashion where the manual configuration workload on the network administrator is reduced by network orchestrator processes. There exists a possibility no matter whether the configuration is achieved automatically, manually, or through a hybrid process, that the topology is misconfigured, resulting in a tunnel loop for the extended VLAN. For example, if a standby tunnel is instead configured to be an active tunnel, a loop may be created. In such examples, since the loop is all contained in the same broadcast domain (i.e. all network infrastructure devices in the loop are L2 transparent), substantial performance degradation may be witnessed when broadcast messages are repetitively cycled through a tunnel loop. While there are existing solutions to L2 looping issues, such as spanning-tree protocol (STP) and shortest path bridging (SPB), these solutions require significant administrative overhead or are not well suited for a multi-LAN deployment when VLANs are extended across the WAN.

In an example, the network orchestrator instructs a gateway with an L2 GRE tunnel of VLAN1 to transmit a message to an adjacent network infrastructure device in the broadcast domain associated with VLAN. At each device, the message is augmented to include identifying information for the device, as well as the entry port and the exit port. As the message is flooded throughout the broadcast domain, one version of the message may return to the initiating device via a tunnel loop. The message that returns will include, as its payload, a listing of the route it took around the loop. The device then forwards the message to the network orchestrator, which subsequently sends a command to a network infrastructure device within the route of the loop to disable message broadcast across a tunnel of the loop in order to sever the loop and prevent performance degradation. This loop detection message can be triggered to be sent not only during initialization of the network, but also for any change in topology of the network, including topology changes of the tunnels.

FIG. 1 illustrates an example SD-WAN 100 including branch gateways 102, headend gateways 104, uplink tunnels 106, client devices 108, and intracluster tunnels 110. BGs 102 are connected to HGs 104 via WAN uplink tunnels 106, and BGs of a duster and HGs of a cluster are respectively interconnected via intracluster tunnels 110. In some examples, it may be advantageous to configure a VLAN across multiple LANs of a SD-WAN. In such configurations, devices on a first LAN, such as VLAN 1 Device 108a and VLAN 1 Device 108c, require connectivity through a WAN uplink to communicate with devices on a second LAN, such as VLAN 1 device 108d, on the same VLAN.

The network orchestrator (not shown) determines that devices belonging to VLAN 1 (devices 108a, 108c, and 108d) are coupled to gateways in both the branch site (which includes manager BG 102a and BG 102b) and the core site (which includes headend GW 104a and headend GW 104b). The network orchestrator may determine that VLAN 1 is extended from information provided by BGs 102 and HGs 104 or through configuration from a network administrator, or from other data sources, or any combination thereof. In some examples, the network orchestrator may transmit a command to manager BG 102a and HG 104a that causes the gateways to establish WAN uplink tunnel 106a. In some examples, a separate tunnel 106 is generated for each extended VLAN. In some other examples, a single tunnel is established for each extended VLAN that traverses the WAN uplink. Practically, if a L2 GRE tunnel is generated, the tunnel is merely created by encapsulating IP packets, so the concept of a single or multiple tunnels is merely semantic. L2 GRE tunnels may be combined with IPSec tunneling to provide encrypted links between certain network infrastructure devices. WAN uplink tunnels 106 forward data traffic of their respective extended VLAN between the respective branch gateway of the branch site (e.g. manager BG 102a) and the respective headend gateway of the core site (e.g. headend GW 104a).

Although WAN uplink tunnel 106a provides a L2 transparent connection between the branch site and the core site, the gateway cluster of the branch site may be susceptible to "black holing", a phenomenon where a device (such as VLAN 1 device 108a) is not able to access other devices (such as VLAN 1 Device 108d) in the same broadcast domain. The network orchestrator, after determining that the branch site includes multiple branch gateways in a branch gateway duster, may transmit a command to the branch gateways of the branch gateway cluster to establish an intracluster tunnel mesh to further extend the affected VLANs to all BGs 102. In the simplified example of FIG. 1, intracluster tunnel 110a completes the tunnel mesh, connecting BG 102b to Manager BG 102a. Once the tunnel mesh is established, devices on an extended VLAN that are not connected to the BG that is terminating the WAN uplink tunnel can also communicate with all other devices of the VLAN. In the example of FIG. 1, VLAN 1 Device 108a can communicate with VLAN 1 Device 108d through BG 102b, Intracluster tunnel 110a, Manager BG 102a, WAN uplink tunnel 106a, and Headend GW 104a. In certain examples, the established intracluster tunnel mesh is a hub and spoke topology, where each non-manager BG of the cluster is coupled via a tunnel to the manager BG. In some other examples, the established intracluster tunnel mesh is a mesh topology, where each BG of the cluster is tunneled to every other BG of the cluster. Although the intracluster tunnel mesh is described in relation to a branch site, the concept is also applicable to a core site and to headend gateways.

In furtherance of HA, a standby WAN uplink tunnel 106b may be established between a different BG 102b and the core site. Multiple standby WAN uplink tunnels may be established in topologies where a duster includes more than two gateways, but practically a single standby tunnel is usually sufficient to protect against common failover scenarios. Standby WAN uplink tunnel 106*b* is idle while WAN uplink tunnel 106*a* is properly functioning.

Although FIG. 1 has heretofore been discussed in relation to a single VLAN (VLAN 1), multiple VLANs may be extended across the sites. In some examples, all active WAN uplink tunnels 106 for all VLANs may be aggregated at a single gateway at each respective site. For example, WAN uplink tunnel 106*a* is a tunnel for VLANs 1 and 2. In some other examples, active WAN uplink tunnels 106 may be distributed across gateways and across uplinks at each site. For example, if WAN uplink tunnel 106*a* was a tunnel only for VLAN 1 and WAN uplink tunnel 106*c* was the active uplink tunnel for VLAN 2. Analogously, intracluster tunnels 110 may be established for all extend VLANs between all gateways of a cluster (such as is shown in intracluster tunnel 110*a*, which tunnels both VLAN 1 and VAN 2) or only for the traffic required by the client devices (such as is shown in intracluster tunnel 110*b*, which tunnels VLAN 2 traffic to and from VLAN 2 device 108*e*).

In some examples, tunnels configured by the network orchestrator (e.g. intracluster tunnels 110*a* and 110*b*, WAN uplink tunnels 106*a* and 106*b*) may exist alongside tunnels that are manually configured by a network administrator (e.g. WAN uplink tunnel 106*c*). In such examples, a tunnel loop may unwittingly be formed due to misconfiguration or misunderstanding of the automated features of the network orchestrator. Due to the fact that all of the network infrastructure devices of the tunnel loop are members of the same broadcast domain, broadcast messages may overwhelm the bandwidth of the tunnel loop (sometimes called a "broadcast storm"). The network orchestrator may employ a process to detect and mitigate such tunnel loops, as is further described in relation to FIG. 2.

Figure 2:
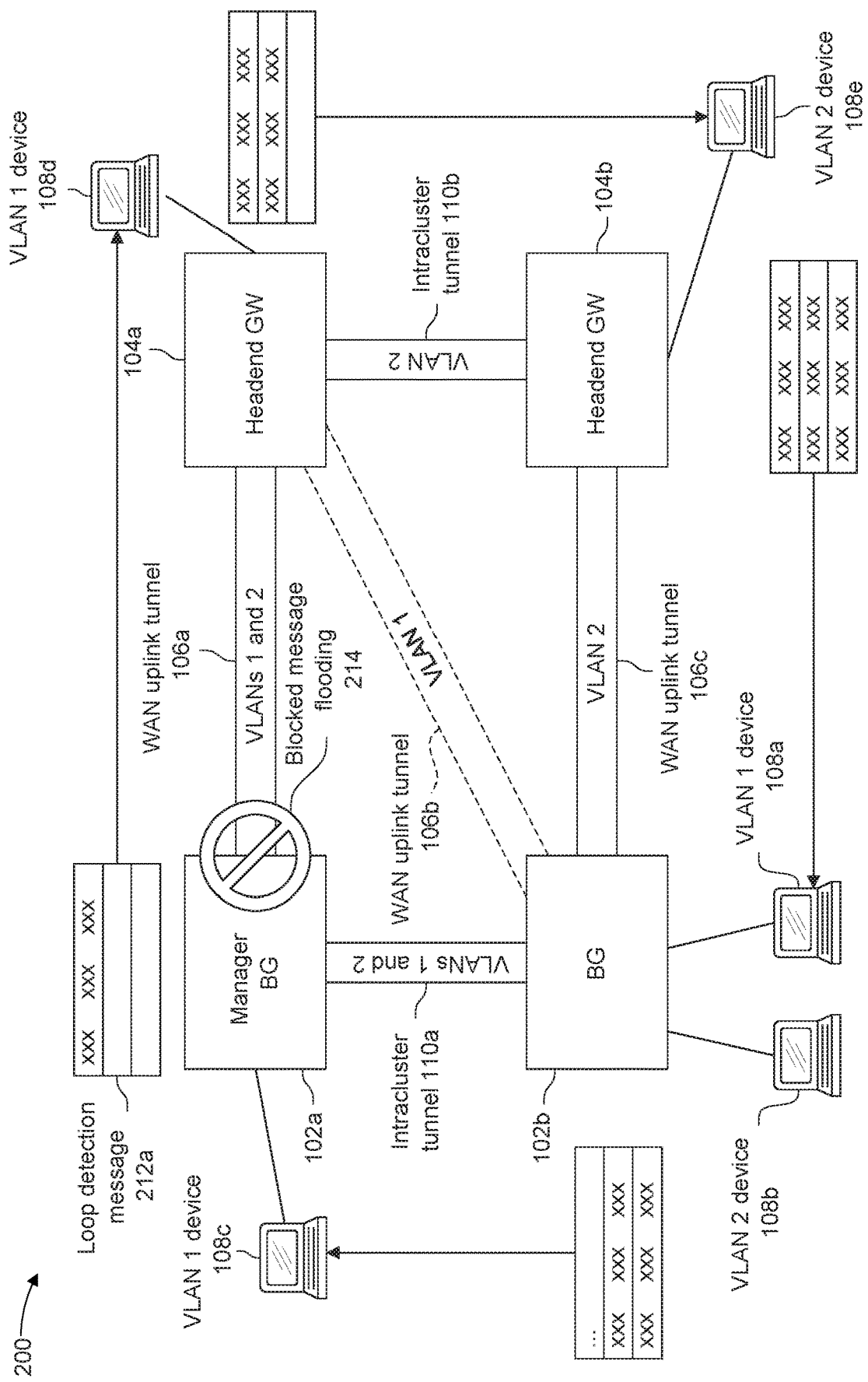
FIG. 2 illustrates an example WAN operating to detect and remediate a tunnel loop.

FIG. 2 illustrates an example WAN operating to detect and remediate a tunnel loop. SD-WAN 200 includes components similar to SD-WAN 100 described in relation to FIG. 1. The network orchestrator (not shown) transmits a command to a gateway of SD-WAN 100 (e.g. Manager BG 102*a*) to determine whether a tunnel loop exists for VLAN 2. In some examples, such as the example illustrated in FIG. 2, the command is transmitted to a manager BG 102*a*. In some other examples, the command is transmitted to a headend GW 104*a*. The network orchestrator may transmit similar commands for all extended VLANs, or may only transmit tunnel loop determination commands when a potential tunnel loop is detected. In contrast to other L2 loops, a tunnel loop is particularly difficult to detect because it crosses various domains, including multiple LAN sites, multiple ISP uplinks, and across the Internet. Since VLAN extension tunnels can be established in multiple ways by multiple entities (e.g. automatically by the network orchestrator when an extended VLAN is detected, manually by a network administrator, etc.).

In the example of FIG. 2, Manager BG 102*a* generates a loop detection message 212*a*, which includes a transit order list. Since Manager BG 102*a* is the initiator, the list only includes one entry. The entry includes a self-identifier ('102*a*'), which can be a MAC address or any other form of device identification, an ingress port ('Self'), which indicates the port of the device on which loop detection message 212*a* was received, and an egress port ('106*a*'), which indicates the port of the device on which loop detection message 212*a* was transmitted. As seen in the initial entry, since there is no ingress port at the initiating BG (Manager BG 102*a*), the ingress port field is set to 'Self'. This field can be set to any appropriate value indicating that the message was generated at that device.

Once the entry is included in loop detection message 212*a*, Manager BG 102*a* forwards the message across WAN uplink tunnel 106*a* to Headend GW 104*a*. Headend GW 104*a* adds another entry to the list (104*a*, 106*a*, 110*b*) and forwards the message 212*a* to Headend GW 104*b*. Loop detection message 212*a* may be individually forwarded across links, or may be flooded across the broadcast domain. Once BG 102*b* receives the message, updates it and forwards it to Manager BG 102*a*, the tunnel loop has been traversed. Upon receiving loop detection message 212*a*, Manager BG 102*a* detects that message 212*a* has already traversed Manager BG 102*a*, meaning that there is a tunnel loop. In some examples, Manager BG 102*a* then forwards message 212*a* to the network orchestrator. In some other examples, Manager BG 102*a* immediately takes actions to resolve the tunnel loop.

The network orchestrator, after receiving loop detection message 212*a*, analyzes the list Included in message 212*a*. The analysis can be done one of many ways. For example, the network orchestrator may iterate through the entries in the list starting from the most recent entry, until a transit across a WAN uplink tunnel (the final WAN uplink tunnel) is found. In another example, the network orchestrator may iterate through the entries starting from the first entry until a transit across a WAN uplink tunnel is found. In such an example, once an appropriate WAN uplink tunnel is found (e.g. WAN uplink tunnel 106*a*), the network orchestrator sends a command to a gateway terminating the tunnel (e.g. Manager BG 102*a*) to reconfigure the tunnel to block message flooding 214. In yet another example, the network orchestrator analyzes each WAN uplink tunnel in the loop to select a tunnel most suitable for blocking broadcast. For example, the WAN uplink tunnels of the loop may be sorted by number of hops, and the longest traversed path (most hops) is chosen to block broadcast. In case of a tie, tunnels with the same number of hops may be sorted by uptime and the most recently created tunnel is chosen to block broadcast. As can be understood by a person having ordinary skill in the art, a WAN uplink tunnel can be chosen to block broadcast due to an characteristics or set of characteristics of the tunnel itself and the tunnel loop. Once the gateway blocks flooding 214 as commanded, the tunnel loop is severed, and any performance degradation due to the loop will cease.

Figure 3:
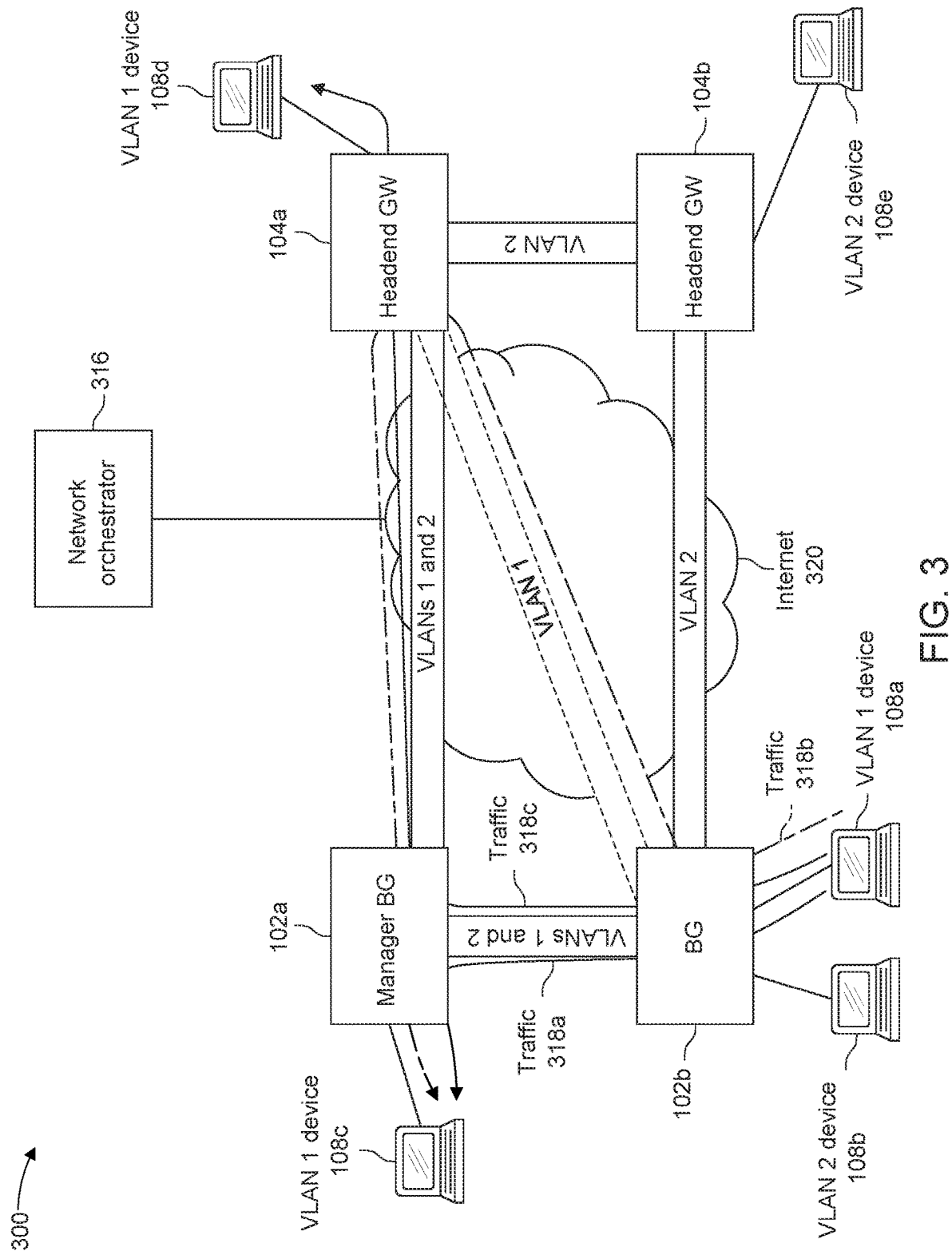
FIG. 3 illustrates an example WAN operating to route intra-VLAN data traffic.

FIG. 3 illustrates an example WAN operating to route intra-VAN data traffic. SD-WAN 300 includes components similar to SD-WAN 100. In addition, FIG. 3 illustrates the network orchestrator 316, traffic 318, and Internet 320.

In regards to routing for data traffic in VLAN 1, without the establishment of the intracluster tunnel between BG 102*b* and Manager BG 102*a*, data traffic from VLAN 1 device 108*a* destined for VLAN 1 device 108*c* follows the route of traffic 318*b* across a pair of WAN uplink tunnels before arriving at Manager BG 102*a* and then to VLAN 1 device 108*c*. This is undesirable because it substantially increases latency and unnecessarily uses limited bandwidth of WAN uplinks.

Once network orchestrator 316 determines that VLAN 1 has been extended across SD-WAN 300, network orchestrator 316 transmits commands to gateways of SD-WAN 300 to establish WAN uplink tunnels and intracluster tunnels. The resultant routes are shown in traffic 318*a* and 318*c*. Rather than requiring two cross-WAN transits, VLAN 1 Device 108*a* can communicate with its LAN cohabitant VLAN 1 Device 108*c* by transmitting data via traffic 318*a*. However, since network orchestrator 316 transmits a command that establishes the WAN uplink tunnel between BG 102*b* and Headend GW 104*a* as a standby tunnel, traffic from VLAN 1 device 108*a* to VLAN 1 device 108*d* must follow the route of traffic 318*c*. This detour is an only minor reduction in performance because intracluster tunnels are usually fast and high bandwidth compared to WAN Uplink tunnels, which pass through Internet 320.

Figure 4:
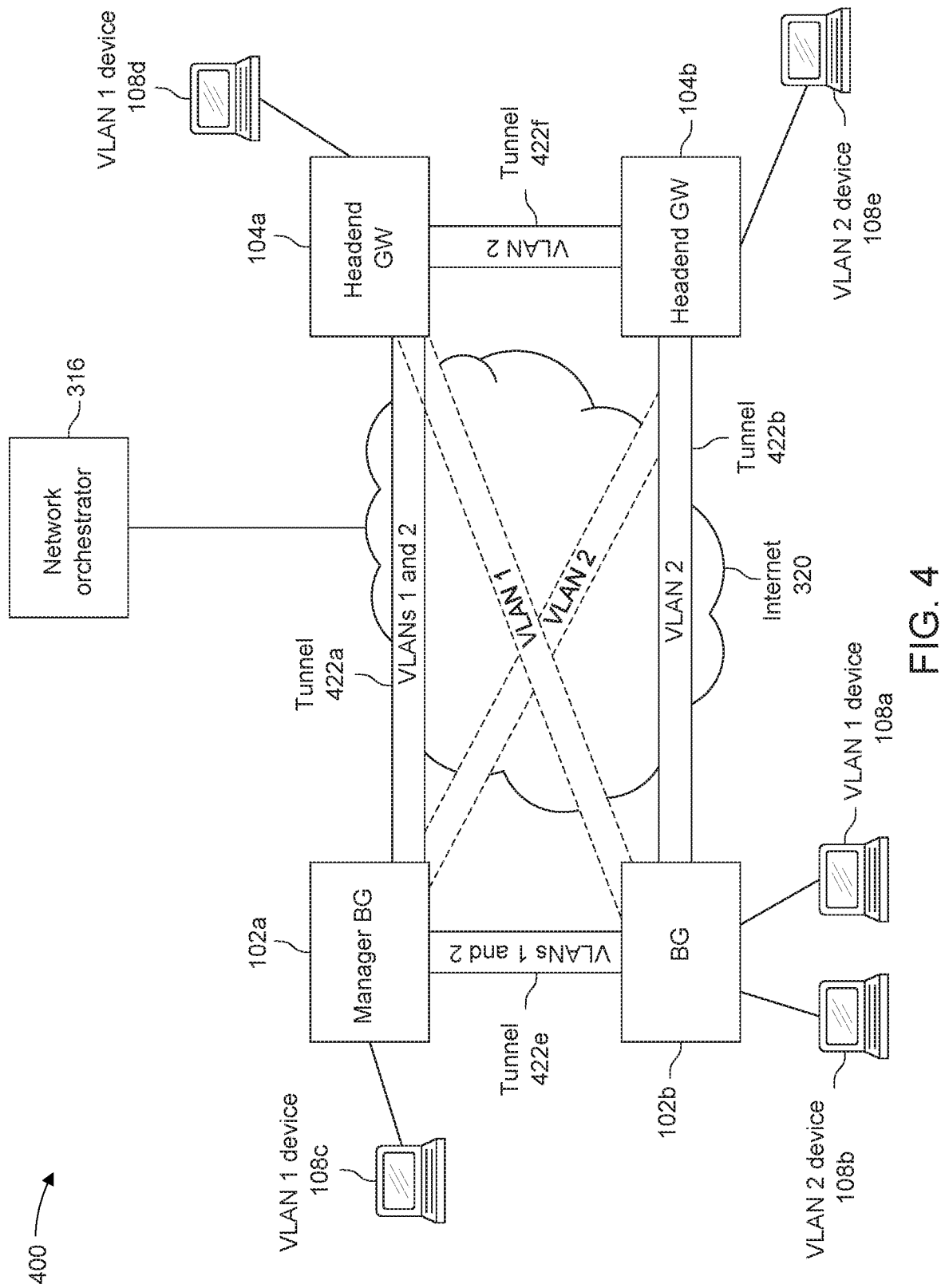
FIG. 4 illustrates an example WAN operating to extend VLANs across the WAN.

FIG. 4 illustrates an example WAN operating to extend VLANs across the WAN. SD-WAN 400 includes similar components to SD-WAN 300 as well as tunnels 422. FIG. 4 illustrates an alternative topology wherein due to both the core site and the branch site being clustered, load between the two extended VLANs (VLAN 1 and VLAN 2) is split across gateways of the cluster. Specifically, the active WAN uplink tunnel for VLAN 1 is tunnel 422*a* between Manager BG 102*a* and Headend GW 104*a*, and the active WAN uplink tunnel for VLAN 2 is tunnel 422*b* between BG 102*b* and Headend GW 104*b*. Beyond establishing WAN uplink tunnels 422*a* and 422*b*, network orchestrator 316 also establishes standby WAN uplink tunnels 422*c* and 422*d* for VLAN 1 and VLAN 2, respectively. In some examples, both termination points of the standby tunnels are different from the termination points of the respective active tunnels. Network orchestrator 316 further establishes intracluster tunnels 422*e* and 422*f* between the respective branch site and core site clusters, transacting both VLAN 1 and VLAN 2 traffic across the intracluster tunnels. This topology provides improved failover capabilities in the core site compared to SD-WAN 300. Network orchestrator 316, branch gateways 102, and headend gateway 104 may include or be executed on devices including a memory and processing circuitry that executes instructions stored in the memory to achieve various functionality described herein.

Each gateway, and the gateway cluster as a whole (e.g. through a global shared memory), can use its respective intracluster tunnels 422*e* and 422*f* for improved routing with the LAN and with the WAN. This improved routing not only applies to intra-VLAN communications (e.g. VLAN 1 device 108*a* to VLAN 1 device 108*c* via VLAN 1 tunnel 422*e*), but also inter-VLAN communications. Routing may dynamically change due to network conditions, load conditions on gateways, changes in VLAN membership, etc. Resultantly, the best route between any two client devices may utilize the intracluster tunnel. For example, VLAN 2 device 108*b* may communicate with VLAN 1 device 108*d*. It may be beneficial, for example, for the data traffic of this communication to transit via tunnel 422*e* within VLAN2's broadcast domain, switch to VLAN1 at Manager BG 102*a*, and transit across the VLAN1 tunnel 422*a*. As a person having ordinary skill in the art would recognize, there are many routing and switching configurations that can take advantage of features of this disclosure to dynamically improve switching and routing across the WAN. For example, tunnels may be reconfigured across gateways of a respective cluster to accommodate changes in one or more characteristics of the network, including but not limited to a number of devices in a VLAN, available bandwidth on an uplink, available capacity on a gateway, version of gateway operating system, type of gateway hardware, etc.

Figure 5:
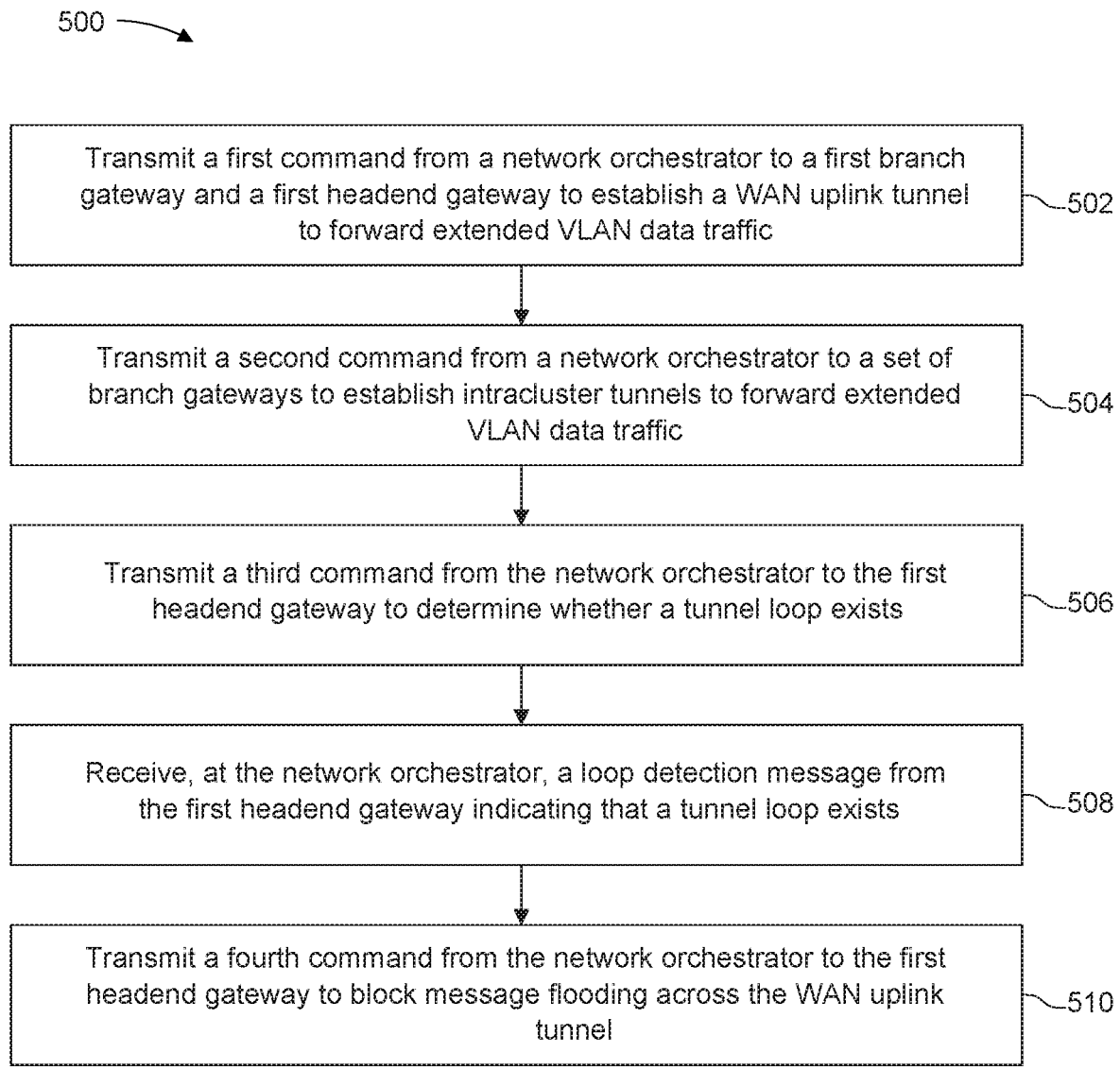
FIG. 5 is a flowchart illustrating an example method for extending VLANs across a WAN.

FIG. 5 is a flowchart illustrating an example method for extending VLANs across a WAN. Method 500 may be encoded into a computer-readable storage medium (e.g. a memory) as instructions and executed by processing circuitry of a device.

In block 502, a first command is transmitted from a network orchestrator to a first branch gateway and a first headend gateway to establish an active WAN uplink tunnel to forward extended VLAN traffic. In some examples, the first command includes a command to establish a standby WAN uplink tunnel between a second branch gateway of a branch gateway cluster and the first headend gateway. It is contemplated that the active WAN uplink tunnel and the standby WAN uplink tunnel can be established between any branch gateway of the branch gateway cluster and any headend gateway of a core site including the first headend gateway.

In block 504, a second command is transmitted from the network orchestrator to a set of branch gateways to establish intracluster tunnels to forward extended VLAN data traffic. In some examples, the set of branch gateways is a subset of the branch gateway cluster. In certain examples, the intracluster tunnels form a hub and spoke topology with the first branch gateway as the hub and the set of branch gateways as the spokes. In certain other examples, the intracluster tunnels form a mesh topology where each of the set of branch gateways is connected to every other of the set of branch gateways via a tunnel.

In block 506, a third command is transmitted from the network orchestrator to the first headend gateway to determine whether a tunnel loop exists. In some examples, a tunnel loop exists when a loop detection message is forwarded through a path for forwarding data traffic of the extended VLAN and returns to an already visited network infrastructure device of the path.

In block 508, a loop detection message is received at the network orchestrator from the first headend gateway indicating that a tunnel loop exists. In some examples, the loop detection message includes a transit order in which the loop detection message arrived at and departed from each network infrastructure device of the path.

In block 510, a fourth message is transmitted from the network orchestrator to the first headend gateway to block message flooding across the WAN uplink tunnel.

In some examples, a fifth message is transmitted from the network orchestrator to the second branch gateway and to a second headend gateway of the core site to establish a second WAN uplink tunnel to forward data traffic of a second extended VLAN between the second branch gateway and the second headend gateway. In certain examples, the network orchestrator selects the second branch gateway and the second headend gateway to terminate the second WAN uplink tunnel based, in part, on traffic load parameters of the second branch gateway and the second headend gateway. The fifth command may include a command to establish a second standby WAN uplink tunnel between the first branch gateway and the first headend gateway.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" encompass one or both of the classification of packets to a flow pattern, as well as the path those classified packets take through the SDN overlay network. "Routes" usually refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

Headend gateways (sometimes referred to as VPN concentrators) are network infrastructure devices that are placed at the edge of a core site LAN. Often headend gateways are routers that interface between the LAN and a wider network, whether it be directly to other LANs of the WAN via dedicated network links (e.g. MPLS) or to the other LANs of the WAN via the Internet through links provided by an Internet Service Provider connection. Many headend gateways can establish multiple uplinks to the WAN, both to multiple other LAN sites, and also redundant uplinks to a single other LAN site. Headend gateways also often include network controllers for the core site LAN. In such examples, a headend gateway in use in a SD-WAN may include a network controller that is logically partitioned from an included router. The network controller may control infrastructure devices of the core site LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A virtual local area network (VLAN) is a logical partition of a portion of a WAN. A VLAN may be contained within a certain LAN of the WAN or it may span across multiple LANs of the WAN. VLANs are implemented in layer 2 of the OSI model (the datalink layer) and, among other benefits, improve network configurability as the size of the network scales. VLAN capable infrastructure devices may allocate VLANs on a per-port basis or may tag certain data frames with information associating the frames with their respective VLANs. VLANs may be used to group related devices, balance load on certain network infrastructure devices, apply security and routing policies on a broad basis, Implement quality of service (QoS), etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

We claim:

1. A computing device, comprising:
    processing circuitry; and
    a memory including instructions that, when executed by the processing circuitry, cause the network orchestrator to:
        determine that a branch site of a wide area network (WAN) includes multiple branch gateways in a branch gateway cluster;
        determine that devices of a core site of the WAN and devices of the branch site are members of an extended virtual local area network (VLAN);
        transmit a first command to a first branch gateway of the branch gateway cluster and a first headend gateway of the core site to establish a WAN uplink tunnel to forward data traffic of the extended VLAN between the first branch gateway and the first headend gateway; and
        transmit a second command to a set of branch gateways of the branch gateway cluster to establish intracluster tunnels between the first branch gateway and the set of branch gateways to forward data traffic of the extended VLAN between the first branch gateway and the set of branch gateways.

2. The computing device of claim 1, wherein the instructions further cause the computing device to:
    transmit a third command to the first headend gateway to determine whether a tunnel loop exists;
    receive a loop detection message forwarded from the first headend gateway indicating that a tunnel loop exists; and
    transmit a fourth command to the first headend gateway to block message flooding across the WAN uplink tunnel.

3. The computing device of claim 2, wherein a tunnel loop exists when the loop detection message is forwarded through a path for forwarding data traffic of the extended VLAN and returns to an already visited network infrastructure device of the path.

4. The computing device of claim 2, wherein the loop detection message includes a transit order in which the loop detection message arrived at and departed from each network infrastructure device of the path.

5. The computing device of claim 4, wherein the instructions further cause the computing device to:
    determine that the WAN uplink tunnel was a final WAN uplink tunnel transited by the loop detection message prior to being forwarded from the first headend gateway.

6. The computing device of claim 1, wherein the first command further comprises a command to establish a standby WAN uplink tunnel between a second branch gateway of the branch gateway cluster and the first headend gateway.

7. The computing device of claim 1, wherein the first command further comprises a command to establish a standby WAN uplink tunnel between a second branch gateway of the branch gateway cluster and a second headend gateway of the core site.

8. A system, comprising:
    a network orchestrator computing device;
    a headend gateway; and
    a manager branch gateway of a branch gateway cluster, including:
    processing circuitry; and
    a memory including instructions that, when executed by the processing circuitry, cause the manager branch gateway to:
        upon receiving a first command from the network orchestrator computing device, establish a wide area network (WAN) uplink tunnel to forward data traffic of an extended virtual local area network (VLAN) between the manager branch gateway and the headend gateway;
        upon receiving a second command from the network orchestrator computing device, establish intracluster tunnels between the manager branch gateway and other branch gateways of the branch gateway cluster to forward data traffic of the extended VLAN;
        upon receiving a third command from the network orchestrator computing device, transmit a loop detection message across the WAN uplink tunnel;
        upon receiving the loop detection message, determine that a tunnel loop exists; and
        forward the loop detection message to the network orchestrator computing device.

9. The system of claim 8, wherein the instructions further cause the manager branch gateway to:
    upon receiving a fourth command from the network orchestrator computing device, block message flooding across the WAN uplink tunnel.

10. The system of claim 8, wherein when data is sent from a first device of the extended VLAN that is coupled to a second branch gateway of the branch gateway cluster to a second device of the extended VLAN that is coupled to the manager branch gateway, the data does not transit through the WAN uplink tunnel.

11. The system of claim 10, further comprising a second headend gateway coupled to the second branch gateway via a second WAN uplink tunnel to forward data traffic of the extended VLAN.

12. The system of claim 11, wherein the tunnel loop comprises:
    the manager branch gateway,
    an intracluster tunnel of the intracluster tunnels between the manager branch gateway and the second branch gateway,
    the second branch gateway,
    the WAN uplink tunnel between the manager branch gateway and the headend gateway,
    the headend gateway, an intracluster link between the headend gateway and the second headend gateway, the second headend gateway, and the second WAN uplink tunnel between the second branch gateway and the second headend gateway.

13. The system of claim 8, wherein the first command further comprises a command to establish a standby WAN uplink tunnel between a second branch gateway of the branch gateway cluster and the headend gateway.

14. A method, comprising:

transmitting a first command from a network orchestrator computing device of a wide area network (WAN) to a first branch gateway of a branch gateway cluster and a first headend gateway of a core site to establish a WAN uplink tunnel to forward data traffic of an extended virtual local area network (VLAN) between the first branch gateway and the first headend gateway;

transmitting a second command from the network orchestrator computing device to a set of branch gateways of the branch gateway cluster to establish intracluster tunnels between the first branch gateway and the set of branch gateways to forward data traffic of the extended VLAN between the first branch gateway and the set of branch gateways;

transmitting a third command from the network orchestrator computing device to the first headend gateway to determine whether a tunnel loop exists;

receiving a loop detection message at the network orchestrator computing device from the first headend gateway indicating that a tunnel loop exists; and transmitting a fourth command from the network orchestrator computing device to the first headend gateway to block message flooding across the WAN uplink tunnel.

15. The method of claim 14, wherein the first command includes a command to establish a standby WAN uplink tunnel between a second branch gateway of the branch gateway duster and the first headend gateway.

16. The method of claim 14, wherein a tunnel loop exists when the loop detection message is forwarded through a path for forwarding data traffic of the extended VLAN and returns to an already visited network infrastructure device of the path.

17. The method of claim 16, wherein the loop detection message includes a transit order in which the loop detection message arrived at and departed from each network infrastructure device of the path, and wherein the network orchestrator computing device determines to block message flooding across the WAN uplink tunnel because the WAN uplink tunnel has the largest number of hops of all WAN uplink tunnels in the transit order.

18. The method of claim 14, further comprising transmitting a fifth command from the network orchestrator computing device to a second branch gateway and a second headend gateway of the core site to establish a second WAN uplink tunnel to forward data traffic of a second extended VLAN between the second branch gateway and the second headend gateway.

19. The method of claim 18, wherein the network orchestrator computing device selects the second branch gateway and the second headend gateway to terminate the second WAN uplink tunnel based, in part, on traffic load parameters of the second branch gateway and the second headend gateway.

20. The method of claim 14, further comprising transmitting a fifth command from the network orchestrator computing device to the first branch gateway, wherein the fifth command includes a command to establish a standby WAN uplink tunnel between the first branch gateway and the first headend gateway.

* * * * *